US011169014B2

(12) United States Patent
Gadea Ramos et al.

(10) Patent No.: US 11,169,014 B2
(45) Date of Patent: Nov. 9, 2021

(54) BIDIRECTIONAL PYCNOMETER

(71) Applicant: Anton Paar QuantaTec, Inc., Boynton Beach, FL (US)

(72) Inventors: Enrique Gadea Ramos, Lake Worth, FL (US); Martin Thomas, Boynton Beach, FL (US); Stefan Thaler, Delray Beach, FL (US)

(73) Assignee: Anton Paar QuantaTec, Inc., Boynton Beach, FL (US)

( * ) Notice: Subject to any disclaimer, the term of this patent is extended or adjusted under 35 U.S.C. 154(b) by 80 days.

(21) Appl. No.: 16/694,615

(22) Filed: Nov. 25, 2019

(65) Prior Publication Data

US 2021/0156725 A1 May 27, 2021

(51) Int. Cl.
*G01F 17/00* (2006.01)
*G01N 9/02* (2006.01)

(52) U.S. Cl.
CPC .............. *G01F 17/00* (2013.01); *G01N 9/02* (2013.01); *G01N 2009/028* (2013.01)

(58) Field of Classification Search
USPC ............................................................ 73/37
See application file for complete search history.

(56) References Cited

U.S. PATENT DOCUMENTS

| 5,074,146 A * | 12/1991 | Orr ........................ G01F 17/00 73/149 |
| 5,157,960 A * | 10/1992 | Brehm ................... G01N 15/08 73/38 |
| 6,036,296 A | 3/2000 | Axtell et al. |
| 6,637,265 B1 * | 10/2003 | Hay, Jr. ..................... G01G 5/00 73/433 |

(Continued)

FOREIGN PATENT DOCUMENTS

| CN | 203981234 U | 12/2014 |
| EP | 0 720 011 A1 | 7/1996 |

(Continued)

OTHER PUBLICATIONS

Pernes, V.; International Search Report in PCT/IB2020/060218; pp. 1-6; Apr. 16, 2021; European Patent Office; P,B, 5818 Patnetlaan 2; NL-2280; HV Rijswijk.

(Continued)

*Primary Examiner* — Clayton E. LaBalle
*Assistant Examiner* — Warren K Fenwick
(74) *Attorney, Agent, or Firm* — Robert A. Blaha; Smith Tempel Blaha LLC

(57) ABSTRACT

An arrangement for measuring a volume of sample is disclosed. The arrangement includes a first chamber for accommodating the sample; at least one second chamber connectable to the first chamber; a first gas path including a first valve connected to the first chamber and on the other end connected to a gas entry path; a second gas path including a second valve, connected to the second chamber and on the other end connected to the gas entry path; a pressure sensor; a third gas path including a third valve, the third gas path connected to the first chamber and on the other end connected, via the third valve, to the pressure sensor; a fourth gas path including a fourth valve, the fourth path being connected to the second chamber and on the other end connected, via the fourth valve, to the pressure sensor.

20 Claims, 2 Drawing Sheets

(56) References Cited

U.S. PATENT DOCUMENTS

| | | | | |
|---|---|---|---|---|
| 6,718,832 | B1* | 4/2004 | Hay, Jr. | G01G 5/00 |
| | | | | 73/37 |
| 6,860,136 | B1* | 3/2005 | Hay, Jr. | G01G 5/00 |
| | | | | 73/1.01 |
| 7,624,621 | B2* | 12/2009 | Firon | G01N 15/0826 |
| | | | | 73/38 |
| 9,970,894 | B2* | 5/2018 | Xie | G01N 27/26 |
| 2017/0010196 | A1 | 1/2017 | Nakai et al. | |
| 2017/0030817 | A1 | 2/2017 | Nakai et al. | |

FOREIGN PATENT DOCUMENTS

| | | | |
|---|---|---|---|
| JP | S63208720 | A | 8/1988 |
| RU | 2435143 | C1 | 11/2011 |
| WO | 2004/013613 | A1 | 2/2004 |

OTHER PUBLICATIONS

Rambaud, Dilek; Written Opinion of the International Searching Authority; pp. 1-9; Apr. 16, 2021; European Patent Office; P,B, 5818 Patnetlaan 2; NL-2280; HV Rijswijk.

* cited by examiner

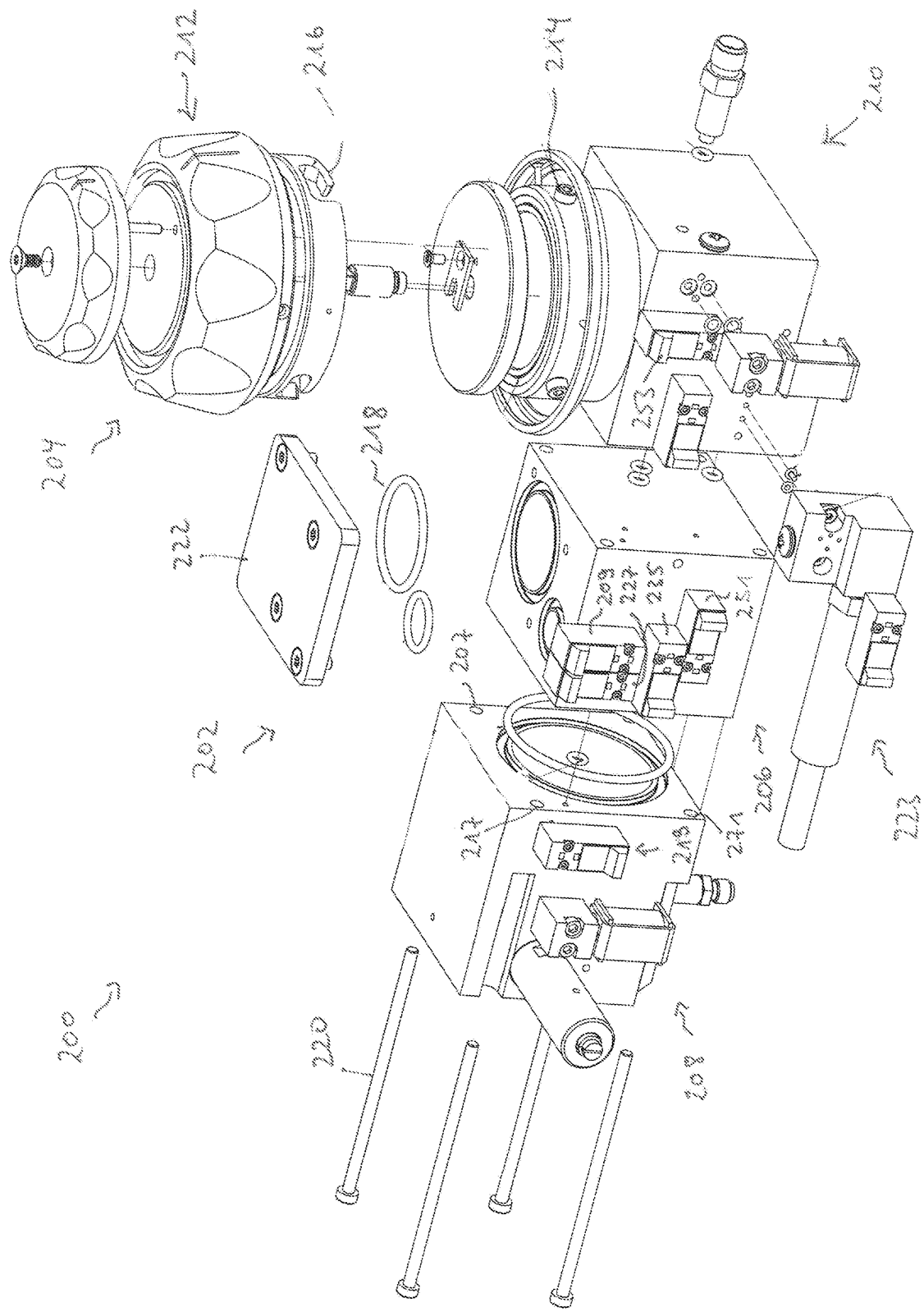

BIDIRECTIONAL PYCNOMETER

TECHNICAL FIELD

Embodiments of the invention generally relate to an arrangement and to a method for manufacturing the arrangement for measuring a volume of a solid or liquid sample, wherein two distinct measuring modes are enabled.

TECHNOLOGICAL BACKGROUND

For determining a volume of a solid or liquid sample (for example for true-density determination), pycnometry is utilized, wherein a gas phase substitution method or a gas expansion method is performed. Thereby, a sample chamber in which the sample to be measured is located is filled with a gas and the gas pressure is measured. Then, the gas is expanded into an expansion chamber and the resulting pressure is measured. Using the Boyle-Mariotte law, the volume of the sample may be determined based on the pressure measurements and based on known volumes of the sample chamber and the expansion chamber.

Instruments and arrangements according to conventional prior art can only be operated unidirectionally meaning that at the beginning, the gas is filled into the sample chamber and will be expanded into the reference chamber or expansion chamber or vice versa.

However, depending on the type of the sample to be measured, it may be advantageous to first fill the gas into the sample chamber or first fill the gas into the expansion chamber and then expand the gas in the respective other chamber. If for example the true density (or volume) of a foam is to be measured, it may be advantageous to first introduce the gas into the sample chamber and allow it later to expand to the reference chamber or expansion chamber. On the other hand, for fine powder it may be more suitable to first fill the expansion chamber or reference chamber and then expand the gas into the sample chamber.

A conventional instrument only provides one direction of the volume measurement or density measurement. A possible reason for this is that the pressure transducer or pressure sensor always has to be connected to the chamber into which the gas is introduced first, therefore hampering changing the direction of the gas flow.

The document U.S. Pat. No. 5,074,146 A discloses a gas comparison pycnometer for determining and checking the accuracy of the volume of a solid substance. A unique cap assembly fixes the volume in the pycnometer's sample chamber from run to run. A series of purges with a suitable gas remove unwanted moisture and vapor out of the system. A gas is first guided into the sample chamber, where the sample is situated and then expands into the expansion/reference chamber.

The document US 2017/0030817 A1 discloses a true density measurement device comprising a sample chamber, an expansion chamber and a pressure sensor. A source of inert gas is connected to the sample chamber in order to first introduce the gas into the sample chamber and then expand it to the expansion chamber.

The document US 2017/0010196 A1 discloses a true density measurement device using a gas phase substitution method. A sample chamber is hermetically sealed by a non-rotating lid.

The document EP 0 720 011 A1 discloses a method for determining the density of a nuclear fuel pellet using gas displacement and isothermal gas expansion. Thereby, gas is introduced into a reference volume first and then the gas is expanded into a manifold being connected to a sample chamber.

The document CN 203981234 U discloses a volume measuring device by using a gas pressure method. The volume of the substance to be measured can be determined by the change of the gas pressure in closed containers. A container is filled with compressed inert gas and after pressure measurement the gas is expanded into another container in which the sample is placed.

It has been observed that instruments and methods according to the prior art do not under all conditions and circumstances (i.e. for all types of samples) provide accurate and reliable determinations of a sample volume and/or a sample density. Thus, there may be a need for an arrangement for measuring a volume of a solid sample, wherein accuracy and/or reliability of the result is improved and which is suitable for a number of different kinds of samples.

SUMMARY

Although in the set of included claims a multiple dependency of one claim to plural other claims is not specified, nevertheless, each of the dependent claims may refer to plural or all other preceding claims according to different embodiments of the present invention. Thus, also features explained, provided or described within the section "Summary of the Invention" may be combined with any other feature referred to or described or provided within this section.

According to an embodiment of the present invention it is provided an arrangement for measuring a volume of a solid or liquid sample, the arrangement or apparatus comprising: a first (e.g. sample) chamber for accommodating the sample; at least one second (e.g. reference or expansion) chamber connectable to the first (e.g. sample) chamber; a first gas (e.g. supply) path including a first valve, the first gas path being on one end connected, via the first valve, to the first chamber and on the other end connected to a gas entry path; a second gas (e.g. supply) path including a second valve, the second gas path being on one end connected, via the second valve, to the second chamber and on the other end connected to the gas entry path; a pressure sensor; a third gas (e.g. measurement) path including a third valve, the third gas path being on one end connected to the first chamber and on the other end connected, via the third valve, to the pressure sensor; a fourth gas (e.g. measurement) path including a fourth valve, the fourth path being on one end connected to the second chamber and on the other end connected, via the fourth valve, to the pressure sensor.

The arrangement may in particular be configured as a pycnometer suitable for measuring the volume of the solid sample and/or the (true) density of the solid sample. In order to determine the density of the solid sample, besides the determination of the volume of the solid sample, also the determination of the mass of the solid sample may be performed by the arrangement (e.g. with an internal balance) or by an auxiliary equipment. Alternatively, if the density of the solid sample is known, the arrangement may be suitable for measuring the volume of the solid sample; the mass of the solid sample may then be determined from these two parameters.

OVERVIEW OF EMBODIMENTS

In some embodiments, the arrangement may comprise two or more pressure sensors.

The arrangement may be operable for example in a temperature range between 5° C. and 50° C. Therefore, the chambers and also the gas paths may be tempered to a desired temperature within the above-mentioned temperature operating range. In particular, all constituents of the arrangement being in thermal contact with the measurement gas may be tempered to a same operating temperature, for example in an error range of ±1° or less.

The solid sample may comprise a foam and/or a powder and/or a compact sample or the like. The volume of the solid or liquid sample may for example be in a range between 0.1 cm$^3$ to 1000 cm$^3$.

The first chamber and the at least one second chamber may provide an inner volume or inner space delimited by wall sections. The chambers may for example substantially have a cylindrical shape or cuboid shape. The chambers may for example be delimited by distinct wall sections of respective containers or may for example be delimited by material of a metal assembly with which the chamber may be in thermal contact or in which the chambers may be harbored or included.

The first chamber may for example comprise a lid or a closing section allowing to open and close the first chamber. The lid may for example be configured as having a gripping portion allowing a user to grasp the lid and engage the grip (for example by a rotation movement) at engaging portions at the first chamber. When the first chamber is opened, the sample may be introduced into the first chamber. After having placed the sample into the first chamber (also referred to as sample chamber), the first chamber may be closed by the lid, namely closed in a gas-tight manner.

An operating relative pressure after filling for example the first chamber or filling the at least one second chamber may for example amount to be in the range between −1 bar and 10 bars, for example. The lid may comprise sealing equipment to maintain the gas at the desired operating pressure within the first chamber when the first chamber is closed by the lid.

The at least one second chamber (also referred to as reference chamber) may not comprise a lid. The at least one second reference chamber may be connected to the first chamber when the third valve as well as the fourth valve are in an open state.

When it is said that a chamber is connectable or connected to another chamber, it may mean, that gas contained in the chamber may freely communicate with the space or inner volume of the other chamber. Thus, when for example the first chamber is connected with the second chamber, the gas in the first chamber and the gas in the second chamber may mix with each other and may distribute across the first chamber as well as the second chamber to reach a same pressure and completely fill the free volume of the first chamber and the inner volume of the second chamber. When it is said that a chamber is connected with a particular valve it is meant that gas contained in the chamber and/or the respective valve may freely communicate with the valve or the chamber, respectively.

Any of the gas paths may be formed by a gas conduit, for example having substantially a circular cross-sectional shape, wherein the gas path is adapted to guide or carry gas substantially without contaminating the gas, without adsorbing components of the gas and without changing the composition of the gas. The gas paths and the chambers may be suitable to be filled or to guide any of conventionally known measurement gases, such as inert gases, such as noble gas or for example nitrogen. In particular, helium may be utilized as a measurement gas. All valves, i.e. the first, the second, the third and the fourth valve may be configured essentially in a same manner, in particular as a solenoid valve, further in particular as a two-way latching valve.

The pressure sensor may for example be configured to measure a relative pressure in an operating range of between −1 bar and 10 bar. The pressure sensor may also be tempered to have substantially a same temperature as the chamber and also as the valves. All gas paths, valves and all chambers may be gas tight also in the above-mentioned pressure range.

The first gas path may also be referred to as a first gas supply path, since it may provide the opportunity to supply measurement gas into the first chamber. The second gas path may also be referred to as a second gas supply path, since the second gas path may enable to fill measurement gas into the second chamber. The third gas path may also be referred to as a third gas measurement path, since the third gas path may be utilized during the measurement for expanding the gas from the first chamber or for connecting the pressure sensor with the first chamber, in order to measure the pressure after the measurement gas has been filled into the first chamber. The fourth gas path may also be referred to as a fourth gas measurement path, since it may be utilized during the measurement to expand the gas already contained within the first chamber (or the second chamber) via the third valve and the fourth valve to the second chamber (or the first chamber). In this situation, the fourth gas path connects the first chamber and the second chamber and also connects both inner volumes of both chambers to the pressure transducer or pressure sensor. According to embodiments of the invention, the third gas path and the fourth gas pas may be utilized to connect the first chamber and the second chamber with each other and with the pressure sensor.

By providing the first, second, third, fourth gas path including the respective first, second, third, fourth valve, the arrangement allows a measurement of the volume of the sample in two different operation modes. In a first operation mode, first the first (sample) chamber is filled with the measurement gas and is then expanded into the second (reference) chamber. In a second measurement mode, first the second chamber is filled with the measurement gas which is then expanded into the first chamber. In both measurement modes, the sample may be placed into the first chamber. By providing two different measurement modes characterized by opposite flow directions of the measurement gas to be expanded, a variety of different types of samples can accurately and reliably be measured.

According to an embodiment of the present invention, the arrangement further comprises a controller adapted to control a state of at least one of the first valve, the second valve, the third valve, the fourth valve, (and in particular the fifth valve and the sixth valve), such as to allow measurement of the sample volume selectively according to a first measurement mode or a second measurement mode, wherein in the first measurement mode, the first chamber in which the sample is accommodated is filled with gas from the gas entry path and the gas is later expanded into the second chamber, wherein in the second measurement mode, the second chamber is filled with gas from the gas entry path and the gas is later expanded into the first chamber in which the sample is accommodated.

The controller may be communicatively connected to the different valves via electrical and/or optical and/or wireless control lines. The controller may also be communicatively connected with the pressure sensor, for example for reading out pressure measurement signals.

Each of the valves may be adapted to be in two different states, namely an open state and a closed state. In the closed state, the respective valve may interrupt gas communication between different sides of the respective valve. In the open state, the respective valve may freely allow communication of gas (for example in one of the gas paths) across different sides of the respective valve. The respective valve may comprise simple solenoid valves which may be in a closed state unless activated by in particular a control signal or control current. In other embodiments, for switching the valve between the closed state and the open state, a single current pulse may be provided to the respective valve configured as two-way latching valve.

The controller may be adapted to control the state of the first valve, the second valve, the third valve, the fourth valve and in particular also a fifth valve and a sixth valve which will be explained further below. Controlling the state of the respective valve allows performing a measurement method for determining the volume of the solid sample. The controller may for example control respective drivers for the valves which may, depending on control signals as transmitted from the controller, generate and transmit suitable driver signals to adjust or change the state of the respective valve.

The gas entry path may for example be connected with a gas container holding the measurement gas. The gas container may be in thermal contact or may not be in thermal contact with the respective chambers and the valves. In particular embodiments of the present invention, the gas entry path including a gas container (also referred to as a third chamber) may be in thermal contact with and in particular may be maintained at a same temperature as the first chamber, the second chamber and the different valves.

For adopting the first measurement mode or the second measurement mode, no physical change or rearrangement of any portions of the arrangement may be necessary. Merely by appropriately switching the states of the different valves, the first measurement mode or the second measurement mode may selectively be established. Thereby, a variety of different types of samples may reliably be measured. For example, a first type group of samples may best be measured using the first measurement mode and a second type group of samples may best be measured by a second measurement mode. A user operating the arrangement may for example simply enter into an input interface the respective type of the sample desired to be measured. Based on the entered type of the sample, the arrangement may automatically switch to the suitable measurement mode, i.e. to the first measurement mode or to the second measurement mode without any further required interference/input by the user. In other embodiments, the type of the measurement mode, i.e. the first or the second measurement mode, may directly be entered by a user.

According to an embodiment of the present invention, in the first and in the second measurement mode, the gas is vented via the gas sink. That is, irrespective of which of the first or the second measurement mode is adopted, the gas is always vented to the same gas sink, e.g. a single gas path. For venting the gas into the gas sink, depending on the measurement mode, a fifth valve or a sixth valve may be opened which will be explained below. Thereby, no physical rearrangement of any gas paths is required, thereby simplifying operating the arrangement.

According to an embodiment of the present invention, the controller is adapted to cause when in the first measurement mode: opening the first valve and the third valve, to allow filling the first chamber with gas from the gas entry path, closing the first valve and measuring a first pressure related to the first measurement mode using the pressure sensor (e.g. after equilibration is reached), (in particular while the first, second, fourth, fifth and sixth (and seventh and eighth) valve are closed); opening the fourth valve (optionally the seventh valve), to allow expanding the gas also into the at least one second chamber and measuring a second pressure related to the first measurement mode, wherein the arrangement is adapted to calculate the volume of the sample based on the first pressure and the second pressure, related to the first measurement mode.

Opening the first valve and the third valve may be performed simultaneously or subsequently. For example, the third valve may be opened, i.e. meaning to set the third valve into the open state, and the first valve may be opened simultaneously or after opening the third valve. The first and the third valve may be kept open until the pressure within the first chamber and the third gas path and also the first gas path (as measured by the pressure sensor) reaches a target pressure which may for example be in a range of between −1 bar and 10 bar. After reaching the target pressure, the first valve may be closed (i.e. set into the closed state) and the first pressure (related to the first measurement mode) may be measured using the pressure sensor. Thereby, a pressure may be measured by the pressure sensor, until the measured pressure does not change by a configurable threshold, thereby specifying a change rate limit/threshold. Thus, it may be waited until the gas temperature within the sample chamber and the third gas path substantially assumes the temperature of the wall section(s) limiting the sample chamber and the material limiting the third gas path. Thus, the first pressure may be determined after equilibration regarding gas temperature is reached. The first pressure may be measured while the first, the second, the fourth, the fifth and the sixth (and optionally also seventh and eighth) valve are closed.

After measuring the first pressure (related to the first measurement mode), the fourth valve (and optionally also a seventh valve explained below) may be opened allowing the gas to expand from the first chamber into the at least one second chamber. Also, the second pressure (related to the first measurement mode) may be measured after equilibration (in particular regarding gas temperature) is reached. Thereby, for example, the pressure measured by the pressure sensors may be tracked and followed until the measured pressure does not change significantly thus the change is below a threshold after a predetermined time interval.

The arrangement (e.g. including a processor) may, besides the first pressure and the second pressure, also utilize the (previously known) volume of the first chamber and the second chamber and may utilize further calibration data as detailed below for volume determination.

According to an embodiment of the present invention, the controller is adapted to cause when in the second measurement mode: opening the second valve and the fourth valve (optionally the seventh valve), to allow filling the at least one second chamber with gas from the gas entry path, closing the second valve (e.g. the second chamber is filled until a target pressure is reached) and measuring a first pressure related to the second measurement mode using the pressure sensor (e.g. after equilibration is reached), (in particular while the first, second, third, fifth and sixth and seventh and eighth valve are closed); opening the third valve, to allow expanding the gas also into the first chamber and measuring a second pressure related to the second measurement mode, wherein the arrangement is adapted to calculate the volume of the sample based on the first pressure and the second pressure, related to the second measurement mode.

For example, the fourth valve and the second valve may be opened simultaneously or subsequently. If a larger volume as the volume of the second chamber is desired to be filled with gas, optionally also the seventh valve may be opened. The seventh valve may connect the second chamber to another second chamber. The second chamber and optionally also the other second chamber may be filled with the measurement gas until a target pressure is reached within the second chamber (and optionally the other second chamber) and also in the second gas path and the fourth gas path. When this target pressure is reached, the second valve may be closed. Then, in particular after reaching a state of equilibrium, the first pressure (related to the second measurement mode) may be measured by the pressure sensor. During measurement of the first pressure, the first, the second, the third, the fifth and sixth and also seventh and eighth valve may be closed.

After having measured the first pressure (related to the second measurement mode), the third valve may be opened thereby connecting the second chamber with the first chamber and allowing expanding the gas across the second chamber as well as the first chamber and the third gas path. After equilibrium has been reached (for example determined by following the measured pressure and the measured pressure does not change significantly over time), the second pressure (related to the second measurement mode) may be measured. In the second measurement mode, the arrangement (processor) calculates the volume of the sample based on the first pressure and the second pressure (both related to the second measurement mode) and optionally also based on known inner volumes of the first chamber, the second chamber, the fourth gas path and the third gas path.

Further, calculating the volume of the sample during any of the measurement modes may also be based on volumes of portions of the first gas path, in particular a volume of the first gas path between the first valve and the first chamber. Further, the calculation may be based on a portion of the second gas path, namely the portion between the second valve and the second chamber. Thus, according to embodiments of the present invention, at least volumes of portions of the gas paths may be considered for calculating the sample volume. These particular portions of the gas paths may be pre-known and may be stored in an electronic storage, for example as calibration data.

According to an embodiment of the present invention, the arrangement further comprises a fifth gas (e.g. vent) path including a fifth valve, the fifth gas path being on one end connected, via the fifth valve, to the first chamber and on the other end connected to a gas sink (e.g. vent); a sixth gas (e.g. vent) path including a sixth valve, the sixth gas path being on one end connected, via the sixth valve, to the second chamber and on the other end connected to the gas sink.

The fifth gas path may also be referred to as a fifth gas vent path, since it may be utilized for venting the first chamber and/or also the second chamber and the connecting gas paths after having performed a measurement according to the first measurement mode. Alternatively, the fifth gas path may be utilized to vent the chambers and gas paths after having performed a measurement according to the second measurement mode. Therefore, only one vent is needed and may be positioned at any place in the instrument.

The sixth gas path including the sixth valve may be utilized for venting the system after a measurement has been performed using the first measurement mode. Alternatively, venting the sixth valve may also be performed after a measurement according to the second measurement mode has been performed. Embodiments of the present invention include only one of these valves, i.e. the fifth valve and the fifth gas path or the sixth valve and the sixth gas path. In this case, either one of the fifth valve or the sixth valve may be utilized (and present) to vent the system when any of the operational measurement modes has been performed. In other embodiments, the fifth valve as well as the sixth valve and also the fifth gas path as well as the sixth gas path may be present.

According to an embodiment of the present invention, the arrangement further comprises after measuring the second pressure related to the first measurement mode: opening the fifth valve, to allow venting the gas from the first chamber and the second chamber to the gas sink. According to an embodiment of the present invention, the arrangement further comprises after measuring the second pressure related to the second measurement mode: opening the sixth valve, to allow venting the gas from the first chamber and the second chamber to the gas sink. Thereby, venting the system to a same gas sink may be provided without physically altering any gas path.

According to an embodiment of the present invention, the arrangement further comprises a processor adapted to calculate the volume of the sample based on at least pressure measurements and volumes of the first chamber and the second chamber, e.g. using the Boyle-Mariotte law.

The processor may for example comprise or execute a computer program which has been loaded into a memory with which the processor is in communication. The calculation may utilize the Boyle-Mariotte law as known from thermodynamics. The Boyle-Mariotte law may assume the validity of the ideal gas equation. In other embodiments, not the Boyle-Mariotte law assuming an ideal gas, but a modified equation may be utilized taking into account deviations of a real gas from the behavior of an ideal gas. The processor may be communicatively connected to the controller, for example also supplying control signals to the controller for appropriately controlling the valves according to a measurement program.

The processor may also be communicatively connected to the pressure sensor to receive pressure measurement signals. Further, the processor may be adapted or may be communicatively connected to one or more temperature sensors being arranged to measure the temperature of the different chambers and/or the gas paths. The processor may receive one temperature measurement of a temperature sensor configured to measure the temperature of a metal assembly harboring (or being in thermal contact with) all chambers as well as all gas paths. It may then be assumed that all sample chambers and gas paths substantially have the same temperature as determined by the temperature measurement sensor or the respective temperatures of the different elements may be derived from the temperature as measured by the temperature sensor utilizing temperature calibration data for example.

According to an embodiment of the present invention, at least one of the first valve, the second valve, the third valve, the fourth valve, (in particular the fifth valve and the sixth valve), includes a unidirectional valve having an input side being leak tight. A unidirectional valve may have only one side, namely the input side (also referred to as supply side), which is leak tight. The unidirectional valve may withstand gas leakage only from the input side but not from the output side (outlet side) of the respective valve. The unidirectional valve may have a substantially smaller dimension and size and weight compared to a bidirectional valve having two leak tight sides. Thereby, the complexity, dimension and weight of the arrangement may be reduced. Furthermore, also the fifth valve and the sixth valve and potentially the eighth valve and the seventh valve may include or be an unidirectional valve having one input side being leak tight.

According to an embodiment of the present invention, at least one of the following applies: an input side of the first valve faces/is connected to the first chamber; an input side of the second valve faces/is connected to the second chamber; an input side of the third valve faces/is connected to the pressure sensor; an input side of the fourth valve faces/is connected to the pressure sensor; the input side of the fourth valve is connected to the first chamber, if the third valve is in an open state; the input side of the third valve is connected to the second chamber, if the fourth valve is in an open state.

When the input side of the first valve faces or is connected to the first chamber, the first valve may, when the first valve is in the closed state, effectively prevent leakage of the gas from the first chamber via the first valve. When the second valve faces or is connected to the second chamber, the second valve may, when in the closed state, effectively prevent leakage of the gas from the second chamber via the second valve. When the third valve faces or is connected to the pressure sensor, it may prohibit gas leakage via the third valve for example in the second measurement mode when the first pressure (related to the second measurement mode) is to be measured after filling the second chamber. When the fourth valve faces or is connected to the pressure sensor, it may effectively prohibit gas leakage through the fourth valve in the first measurement mode after the first chamber has been filled with the gas and the first pressure (related to the first measurement mode) is to be measured. Thereby, the first as well as the second measurement mode may be performed.

According to an embodiment of the present invention, the arrangement further comprises an eighth valve on one end connected to the first valve, the second valve and the gas entry path and on another end connected to another gas sink. In particular, the eighth valve may on one end be connected (with its input side) to output sides of the first valve and the second valve and connected to the gas entry path.

To prevent that the second valve and/or the first valve leak across their seat after dosing the pressure or filling the respective chambers, the eighth valve may be used to vent their output side to atmosphere. Thus, the eighth valve may lead at its outlet side to atmosphere. The eighth valve may be a unidirectional valve. In this case, the eighth valve may be connected with its input side to output sides of the first valve and the second valve and may also be connected to the gas entry path.

According to an embodiment of the present invention, at least one of the following applies: the gas entry path includes a gas entry valve; and at least one of the first valve, the second valve, the third valve, the fourth valve, (in particular the fifth valve and the sixth valve), includes or is a solenoid valve, in particular a two-way latching valve.

The gas entry valve may be opened to fill the gas (from a gas container) into the first chamber or the second chamber (and/or a third chamber as described below). A two-way latching valve may be a valve which changes its state upon receiving a current pulse. Thereby, controlling the states of the valves may be simplified. In particular, no continuing voltage or current may be required to be supplied to the respective valve to adopt the open state. Thereby, the control of the arrangement may further be simplified.

According to an embodiment of the present invention, the arrangement further comprises an electronic storage containing volume calibration data for the first chamber and the second chamber for calculating the sample volume.

The electronic storage may comprise volume calibration data as well as temperature calibration data. The volume calibration data may for example comprise volumes of all chambers and volumes or volume portions of all (or some) relevant gas paths. Further, by using temperature calibration data for example the effective temperature of any of the chambers or any of the gas paths may be inferred from for example one or more measured temperatures at locations close to or remote from the respective chamber or gas path. Thereby, it is enabled to perform a volume measurement according to the first or to the second measurement mode.

According to an embodiment of the present invention, the arrangement further comprises a metal assembly in thermal contact with/harboring/including the first chamber, the second chamber and at least one gas path; and a tempering equipment for tempering the metal assembly to a desired temperature, wherein in particular at least a portion of at least one gas path is implemented as a bore in the metal assembly.

The metal assembly may comprise a single metal block, for example an aluminum block, or may comprise plural metal assembly portions connected to each other, for example by bolts. The first chamber and/or the second chamber (and potentially also a third chamber) may be established as a respective recess within the metal assembly or metal structure which may for example be realized by milling or cutting. In this case, the metal assembly may harbor the first chamber, the second chamber and at least one gas path and also optionally the third chamber. Thus, limiting walls of the respective chambers may be formed by material of the metal assembly itself. In other embodiments, the metal assembly may comprise recesses into which distinct containers providing the different chambers are inserted.

The tempering equipment may comprise an electrical heater and cooler, in particular at least one Peltier element enabling heating and/or cooling the metal assembly. The metal assembly may provide a significant thermal capacity and may be a good heat conductor. Essentially, the temperature may be equal or at least very similar across the entire extent of the metal assembly. Therefore, also the temperature within the different chambers and the gas paths may substantially be the same or at least very similar. Since pressure and/or volume of a gas dedicatedly or sensitively depend on the temperature, providing equal temperature in all involved portions of the measurement may improve the reliability and/or accuracy of the volume determinations. To provide a bore in the metal assembly may easily be achieved. Thereby, distinct elements for the gas path may not be required or necessary any more.

According to an embodiment of the present invention, the arrangement comprises a third chamber (e.g. acclimation chamber) connected to a gas supply source and providing the gas entry path into the first gas path and the second gas path, wherein the third chamber is in thermal contact with and/or harbored in the metal assembly.

The third chamber may also be referred to as an acclimation chamber which may be provided for equilibrating the gas temperature before introduction of the gas into the first chamber or the second chamber to the temperature of the first chamber and the second chamber or in general to the temperature of the metal assembly. When the gas contained in the third chamber is already substantially at the temperature of the metal assembly and in particular the temperature of the first cell and/or the second chamber, an equilibration time for equilibration of the gas temperature after filling the gas into the first chamber and/or the second chamber may be shortened, thereby also shortening the total volume measurement time. An output of the third chamber may thereby provide the gas entry path. The third chamber may also be harbored within the metal assembly, for example implemented as a recess within the metal assembly which is closed by a closing plate, e.g.

According to an embodiment of the present invention, the third chamber encloses a metallic material providing high surface area, wherein the metallic material is in thermal contact with the metal assembly, wherein the metallic material comprises at least one of: a fibrous web, a sintered structure, a loose material, a mesh, a fleece, a fabric, a non-woven fabric, a woven fabric, and a mat. The metallic material may further comprise metallic spheres, metallic powder or any other material that improves the thermal conductivity between the gas and the chamber. When metallic material is enclosed within the third chamber and is thermal contact with the metal assembly, the gas within the third chamber surrounding the metallic material may in a fast manner be brought to the temperature of the metal assembly. Since the temperature of the metal assembly substantially corresponds or equals to the temperature of the first chamber and the second chamber, also the equilibration time for equilibrating the gas to the temperature of the first chamber or the second chamber after filling the gas into the respective chamber may be shortened. The metallic material may be configured in a number of different manners. Provided that the surface area of the metallic material is much larger than the surface area of the metallic material when the metallic material would be in a continuous or compact constitution.

According to an embodiment of the present invention, the metal assembly comprises a first metal portion harboring the first chamber, a second metal portion harboring the second chamber and a third metal portion harboring the third chamber, wherein the first metal portion is mounted at a side flat surface to a side flat surface of the second metal portion and another side flat surface of the second metal portion is mounted at a side flat surface of the third metal portion.

When the metal assembly is assembled from the first metal portion, the second metal portion and optionally the third metal portion, an easy construction is provided being easily manufacturable. Interfaces between portions of one or more flow paths between adjacent metal portions of the metal assembly may be provided with a respective seal, such as O-ring, to prevent leakage at mounting interfaces of the metal portion. Thereby, a compact arrangement may be achieved.

According to an embodiment of the present invention, at least one valve is surface mounted on an external surface of the metal assembly. The valve may for example be mounted on top of exits of two portions of gas paths. Surface mounting the valves or at least one of the valves may simplify the manufacturing process.

It should be understood, that features, individually or in any combination, disclosed, described, explained or provided for in an arrangement for measuring a volume of a solid sample may also be applied, individually or in any combination, to a method for manufacturing an arrangement for measuring a volume of a solid sample according to embodiments of the present invention and vice versa.

According to an embodiment of the present invention it is provided a method of manufacturing an arrangement for measuring a volume of a solid or liquid sample, the method comprising: providing a first gas path including a first valve, the first gas path being on one end connected, via the first valve, to a first chamber for accommodating the sample and on the other end connected to a gas entry path; providing a second gas path including a second valve, the second gas path being on one end connected, via the second valve, to at least one second chamber connectable to the sample chamber and on the other end connected to the gas entry path; providing a third gas path including a third valve, the third gas path being on one end connected to the first chamber and on the other end connected, via the third valve, to a pressure sensor; and providing a fourth gas path including a fourth valve, the fourth path being on one end connected to the second chamber and on the other end connected, via the fourth valve, to the pressure sensor.

BRIEF DESCRIPTION OF THE DRAWINGS

FIG. 2 illustrates an exploded three-dimensional view of the arrangement illustrated in FIG. 1 according to an embodiment of the present invention.

DETAILED DESCRIPTION OF ILLUSTRATED EMBODIMENTS

Figure 1:
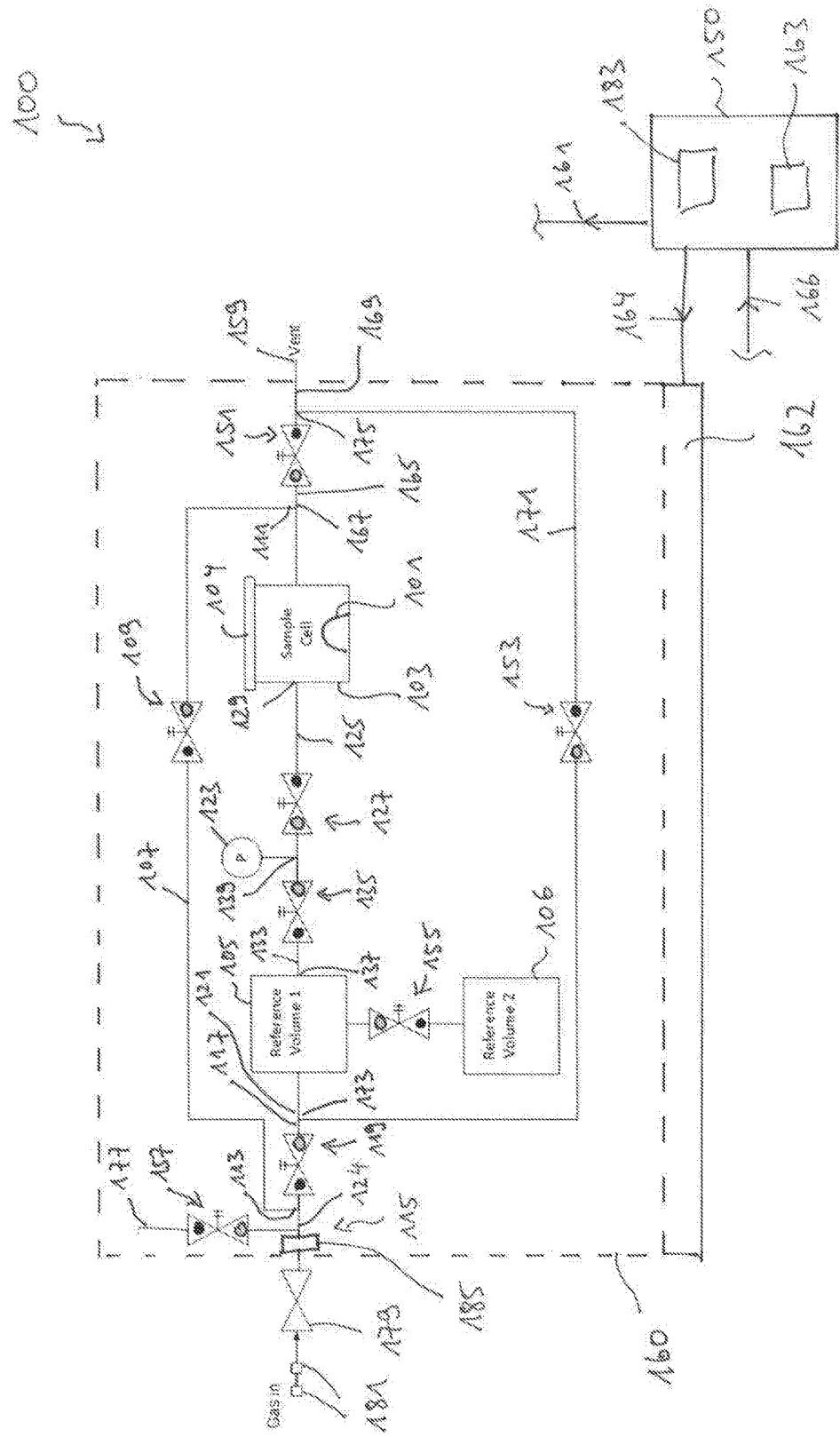
FIG. 1 schematically illustrates as a fluid diagram an arrangement for measuring a volume of a solid sample according to an embodiment of the present invention.

The aspects defined above and further aspects of the present invention are apparent from the examples of embodiment to be described hereinafter and are explained with reference to the illustrated embodiments. The invention will be described in more detail hereinafter with reference to illustrated examples but to which the invention is not limited.

Embodiments of the present invention provide a pycnometer which can be operated bidirectionally. The arrangement of valves and chambers and other components facilitates operation in both directions, for example depending on sample type and industry standards. One advantage of the arrangement for measuring a volume of a solid sample may be that it can be switched without physically swapping or changing components to optimize the operation sequence for measurement.

The arrangement 100 for measuring a volume of a solid sample 101 according to an embodiment of the present invention comprises a first chamber 103 for accommodating the sample 101. Further, the arrangement 100 comprises at least one second chamber 105 connectable to the sample chamber 103. Further, the arrangement 100 comprises a first gas supply path 107 including a first valve 109, wherein the first gas path 107 is on one end 111 connected via the first valve 109 to the first chamber 103 and on the other end 113 connected to a gas entry path 115. The arrangement further comprises a second gas supply path 117 including a second valve 119, the second gas path 117 being on one end 121 connected, via the second valve 119, to the second chamber 105 and on another end 124 connected to the gas entry path 115.

The arrangement 100 further comprises a pressure sensor 123 and a third gas measurement path 125 including a third valve 127, the third gas path 125 being on one end 129 connected to the first chamber 103 and on the other end 139 connected, via the third valve 127, to the pressure sensor 123. The arrangement 100 further comprises a fourth gas measurement path 133 including a fourth valve 135, the fourth gas path 133 being on one end 137 connected to the second chamber 105 and on the other end 139 connected, via the fourth valve 135 to the pressure sensor 123.

The arrangement 100 further comprises a controller 150 adapted to control a state of the first valve 109, the second valve 119, the third valve 127, the fourth valve 135 and in particular also the state of a fifth valve 151, a sixth valve 153, a seventh valve 155 and an eighth valve 157, such as to allow measurement of the sample volume selectively according to a first measurement mode or a second measurement mode. Therefore, the controller receives pressure measurement signals 166 from the pressure sensor 123.

In the first measurement mode, the first chamber 103 in which the sample 101 is accommodated is filled with gas from the gas entry path 115 and the gas is later expanded into the second chamber 105. In the second measurement mode, the second chamber 105 is filled with gas from the gas entry path 115 and the gas is later expanded into the first chamber 103 in which the sample 101 is accommodated. In the first as well as in the second measurement mode, the gas is vented via a gas sink 159.

The controller 150 provides, for controlling the valves, valve control signals 161 to the respective valves. When in the first measurement mode, the controller is adapted to cause by the control signals 161 opening the first valve 109 and the third valve 127, to allow filling the first chamber 103 with gas from the gas entry path 115, closing the first valve 109 and measuring a first pressure (related to the first measurement mode) using the pressure sensor 123. Further, the controller causes opening the fourth valve 135 and optionally the seventh valve 155, to allow expanding the gas into the at least one second chamber 105 and in particular also optionally into another second chamber 106 via the seventh valve 155. Then, a second pressure (related to the first measurement mode) may be measured and a processor 163 comprised in the controller 150 calculates the volume of the sample 101 based on the first pressure and the second pressure.

When in the second measurement mode, the controller 150 is adapted to cause opening the second valve 119 and the fourth valve 135, to allow filling the second chamber 105 with gas from the gas entry path (and optionally also the other second chamber 106 by further opening the seventh valve 155). Then, a first pressure (related to the second measurement mode) may be measured using the pressure sensor 123. Further, the controller 150 causes opening the third valve 127 to allow expanding the gas into the first chamber 103 and measuring a second pressure (related to the second measurement mode). The processor 163 is then adapted to calculate the volume of the sample 101 based on the first pressure and the second pressure (both related to the second measurement mode).

For venting purposes, the arrangement 100 comprises a fifth gas vent path 165 including the fifth valve 151, wherein the fifth gas path 165 is on one end 167 connected, via the fifth valve 151 to the first chamber 103 and on the other end 169 connected to the gas sink 159. The arrangement further comprises a sixth gas vent path 171 including the sixth valve 153, the sixth gas path 171 being on one end 173 connected to the second chamber 105 and on the other end 175 connected to the gas sink 159.

In the illustrated embodiment, the valves are implemented or configured as unidirectional two-way latching valves having an input side and an output side or supply side and outlet side, wherein the supply or input side is depicted as an open circle and the output side is depicted as a closed or filled circle. As can be taken from FIG. 1, the input side of the first valve 109 faces the first chamber 103. Further, the input side of the second valve 119 faces the second chamber 105. Further, the input side of the third valve 127 faces the pressure sensor 123. Furthermore, the input side of the fourth valve 135 also faces the pressure sensor 123. Furthermore, the input side of the fourth valve 135 is connected to the first chamber 103, if the third valve 127 is in an open state. Further, the input side of the third valve 127 is connected to the second chamber 105, if the fourth valve 135 is in an open state.

The arrangement 100 further comprises an eighth valve 157 on one end connected to the first valve 109, the second valve 119 and the gas entry path 115 and on another end connected to another gas sink 177. The arrangement 100, in particular the controller 150, includes an electronic storage 183 containing volume calibration data and/or temperature calibration data.

The gas entry path 115 includes a gas supply valve 179 being connected with a gas container 181. The gas entry path 115 may or may not include an acclimation chamber 185. Thus, in embodiments the acclimation chamber 185 is not present.

The arrangement 100 illustrated in FIG. 1 however further comprises a third chamber 185 for acclimation purposes connected to the gas supply source 181, 179 and providing the gas entry path 115 into the first gas path 107 and the second gas path 117, wherein the third chamber 185 is in thermal contact or harbored in a metal assembly 160. The metal assembly 160 is also in thermal contact with or harbors the first chamber 103, the second chamber 105 and the gas paths 107, 117, 133, 125, 165, 171 and all the valves 109, 151, 153, 155, 135, 127, 119, 157. A tempering equipment 162 for example comprising a Peltier element is further provided and in thermal contact with the metal assembly 160 for tempering the metal assembly 160 to a desired temperature. The tempering equipment 162 is controlled by control signals 164 from the controller 150.

The third chamber 185 (if present) may have a volume being for example in a range of 0.1 and 10 times the volume of the second chamber 105 or the first chamber 103. Thus, the third chamber 185 is not drawn to scale in FIG. 1. The third chamber 185 may be filled with a not illustrated mesh filter or metal mesh, for example a knitted wire mesh filter. It should be noted that the third chamber 185 is an optional feature of the arrangement 100 and may be absent in other embodiments of the present invention.

As is illustrated in FIG. 1, the sample chamber 103 is closed by a lid 104. For loading the sample 101 into the first chamber 103, the lid 104 may be removed by a user.

FIG. 2 illustrates in an exploded perspective view a realization of an arrangement for measuring a volume of a solid sample according to an embodiment of the present invention. Elements similar in structure and/or function in FIGS. 1 and 2 are labelled with reference signs differing only in the first digit. A description of one element not in detail described in one particular embodiment may be taken from the description of this respective element in the context of another embodiment or figure.

The arrangement 200 comprises a metal assembly 202 comprising a first metal portion 210 harboring a not visible first chamber, a second metal portion 206 harboring a not visible second chamber and a third metal portion 208 harboring the not visible third chamber. Therein, the first metal portion 210 is (in the assembled arrangement 200) mounted at a side flat surface to a side flat surface of the second metal portion 206 and or another side flat surface of the second metal portion 206 is mounted at a side flat surface of the third metal portion 208. Thereby, the first, the second and the third metal portions are arranged in a series.

The lid 204 for closing the first chamber harbored in the first metal portion 210 is also illustrated in FIG. 1 comprising a grip portion 212 allowing to twist or turn the lid 204 comprising a hook 216 for engaging or disengaging with engaging portions 214 connected to the first metal portion 210.

As can be seen in FIG. 2, some or all gas paths are realized by bores within the metal portions 210, 206, 208. For example, the first gas path 207, the second gas path 217 and the sixth gas path 271 are shown in portions as bores. Further, it can be taken from FIG. 2 that the valves are mounted at an external surface of the metal assembly 202. In particular, for example the second valve 219 (or another valve) is surface mounted at an external surface of the third metal portion 208. The third metal portion 208 may be covered with plate 222. The first valve 209, the third valve 227, the fourth valve 235, and/or the fifth valve 251 (or others) may be mounted at an external surface of the second metal portion. As can further be taken from FIG. 2, seal rings 218 provide gas tight connections between the different components when assembled. The three metal portions 210, 206, 208 may for example be mounted to each other using bolts 220. Further, the pressure sensor or pressure transducer 223 is shown and is also surface mounted to the metal assembly.

Embodiments of the present invention may or may not include the third metal portion 208 harboring the third chamber.

When a normal solid is to be measured, the second measurement mode may be adopted, wherein first the second chamber 105 (or optionally also the other second chamber 106) is filled with gas. Thereafter, after measuring the first pressure (related to the second measurement mode), the gas may be expanded into the first chamber, i.e. the sample chamber.

If a foam or a similar type of material is to be measured, the first measurement mode may be adopted. Thus, the first chamber may be pressurized first, i.e. filled with gas, swapping thereby the function of either chamber. Thereby, the pressure transducer may be kept on the first chamber but swapping the sample from the first to the second chamber thereby demanding open access to be provided to both chambers.

Below several characteristics of the instrument or the arrangement for measurement of a volume of a solid sample is described.

The arrangement may have open access only to one chamber, i.e. the first chamber (or sample chamber).

The arrangement may route the gas in either direction (i.e. not fixed) without reconfiguring external connection (i.e. the gas input may always be the gas input and the vent may always be the vent).

The arrangement may self-configure the internal gas paths to be optimal for powders, non-powders and foams.

The arrangement may include more than one reference volume, all of which may be used in either direction.

The arrangement may retain multiple volume calibration values that are automatically invoked based on direction and sample chamber volume.

To derive the volume of the sample, also an ambient pressure may be utilized. The ambient pressure may for example be measured by communicating the gas sink 159 with the pressure sensor 123, 223 by the operation of the valves, wherein the gas sink 159 is at atmospheric pressure.

The ambient pressure may for example be measured by opening all valves (for example with exception of the first valve 109 and/or the second valve 119 and/or the gas supply valve 179) and measuring the pressure by the pressure sensor 123, 223. For evaluating the experiment and deriving the sample volume, the ideal gas law may be used. As the amount of gas molecules is constant in the system before and after expansion, the Boyle-Mariotte law may be employed to calculate the unknown sample volume Vs: The unknown sample volume may (e.g. for the first measurement mode) be calculated as $$Vs = Vc - (Va/(P1/P2 - 1)),$$

wherein P1 is the first pressure (e.g. related to the first measurement mode), P2 is the second pressure (e.g. related to the first measurement mode), Vc is the volume of the first chamber and Va is the volume of the second chamber.

The first measurement mode may be better suited for the analysis of foam, for example. However, measuring fine powders in the first measurement mode may have the risk of contamination of the instrument. In contrast, by using the second measurement mode applied to fine powders, the risk of contamination may be low.

Embodiments of the present invention provide an instrument or arrangement supporting both directions of gas pycnometry measurements (sample volume first or reference volume first) and the user may decide which direction he wants to use for a single analysis.

The sequence used for the first measurement mode may be as follows: Equalize the pressure between the first and the second chambers by opening the third valve 127 and the fourth valve 135. Close the third valve 127 and the fourth valve 135. Open the first valve 109 and the third valve 127 until a target pressure is obtained. Close the first valve 109 and record a stable pressure value. Open the fourth valve 135 and if required the seventh valve 155 and record a stable pressure value. Calculate the unknown sample volume and vent the system by opening the sixth valve 153.

For measurement according to the second measurement mode, the following sequence may be used: Equalize the pressure between the first and the second chambers by opening the third valve 127 and the fourth valve 135. Open the second valve 119 and the fourth valve 135 and if required the seventh valve 155, until a target pressure is obtained. Close the second valve 119 and record a stable pressure value. Open the third valve 127 and record a stable pressure value. Calculate the unknown sample volume and vent the system by opening the fifth valve 151.

An advantage compared to a conventional pycnometer may be that the user may choose the direction of the measurement method what is best suited for the current sample.

One characteristic of embodiments is that the fluid diagram is designed in a way that also unidirectional valves may be used. Unidirectional valves are only leak-tight in one direction. Therefore, their input side may have to face the relevant chamber volume. To prevent the second valve 119 and the first valve 109 to leak across their seat after dosing the pressure, the eighth valve 157 can be used to vent the outlet side to atmosphere. The system can also, according to other embodiments, be designed or implemented using bi-directional valves. In some embodiments, the eighth valve 157 may not be required.

It should be noted that the term "comprising" does not exclude other elements or steps and the article "a" or "an" does not exclude a plurality. Also, elements described in association with different embodiments may be combined.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. An arrangement for measuring a volume of a solid or liquid sample, the arrangement, comprising:
    a first chamber for accommodating the sample;
    at least one second chamber connectable to the first chamber;
    a first gas path including a first valve, the first gas path being on one end connected, via the first valve, to the first chamber and on the other end connected to a gas entry path;
    a second gas path including a second valve, the second gas path being on one end connected, via the second valve, to the second chamber and on the other end connected to the gas entry path;
    a pressure sensor;
    a third gas path including a third valve, the third gas path being on one end connected to the first chamber and on the other end connected, via the third valve, to the pressure sensor; and
    a fourth gas path including a fourth valve, the fourth path being on one end connected to the second chamber and on the other end connected, via the fourth valve, to the pressure sensor.

2. The arrangement according to claim 1, further comprising:
    a controller adapted to control a state of at least one of the first valve, the second valve, the third valve, the fourth valve, such as to allow measurement of the sample volume selectively according to a first measurement mode or a second measurement mode,
    wherein in the first measurement mode, the first chamber in which the sample is accommodated is filled with gas from the gas entry path and the gas is later expanded into the second chamber,
    wherein in the second measurement mode, the second chamber is filled with gas from the gas entry path and the gas is later expanded into the first chamber in which the sample is accommodated.

3. The arrangement according to claim 2, wherein in the first and the second measurement mode the gas is vented via a gas sink.

4. The arrangement according to claim 2, wherein the controller is adapted to cause when in the first measurement mode:
    opening the first valve and the third valve, to allow filling the first chamber with gas from the gas entry path, closing the first valve and measuring a first pressure related to the first measurement mode using the pressure sensor;
    opening the fourth valve, to allow expanding the gas also into the at least one second chamber and measuring a second pressure related to the first measurement mode, wherein the arrangement is adapted to calculate the volume of the sample based on the first pressure and the second pressure, related to the first measurement mode.

5. The arrangement according to claim 2, wherein the controller is adapted to cause when in the second measurement mode:
    opening the second valve and the fourth valve, to allow filling the at least one second chamber with gas from the gas entry path, closing the second valve and measuring a first pressure related to the second measurement mode using the pressure sensor;
    opening the third valve, to allow expanding the gas also into the first chamber and measuring a second pressure related to the second measurement mode, wherein the arrangement is adapted to calculate the volume of the sample based on the first pressure and the second pressure, related to the second measurement mode.

6. The arrangement according to claim 4 or claim 5, further comprising at least one of the following:
    a fifth gas path including a fifth valve, the fifth gas path being on one end connected, via the fifth valve, to the first chamber and on the other end connected to a gas sink;
    a sixth gas path including a sixth valve, the sixth gas path being on one end connected, via the sixth valve, to the second chamber and on the other end connected to the gas sink.

7. The arrangement according to claim 6,
    wherein the controller is adapted to cause when in the first measurement mode:
    opening the first valve and the third valve, to allow filling the first chamber with gas from the gas entry path, closing the first valve and measuring a first pressure related to the first measurement mode using the pressure sensor;
    opening the fourth valve, to allow expanding the gas also into the at least one second chamber and measuring a second pressure related to the first measurement mode,
    wherein the arrangement is adapted to calculate the volume of the sample based on the first pressure and the second pressure, related to the first measurement mode, further comprising after measuring the second pressure related to the first measurement mode:
    opening the fifth valve, to allow venting the gas from the first chamber and the second chamber to the gas sink.

8. The arrangement according to claim 6,
    wherein the controller is adapted to cause when in the second measurement mode:
    opening the second valve and the fourth valve, to allow filling the at least one second chamber with gas from the gas entry path,
    closing the second valve and measuring a first pressure related to the second measurement mode using the pressure sensor;
    opening the third valve, to allow expanding the gas also into the first chamber and measuring a second pressure related to the second measurement mode,
    wherein the arrangement is adapted to calculate the volume of the sample based on the first pressure and the second pressure, related to the second measurement mode, further comprising after measuring the second pressure related to the second measurement mode:
    opening the sixth valve, to allow venting the gas from the first chamber and the second chamber to the gas sink.

9. The arrangement according to claim 1, further comprising:
    a processor adapted to calculate the volume of the sample based on at least pressure measurements and volumes of the first chamber and the second chamber.

10. The arrangement according to claim 1, wherein at least one of the first valve, the second valve, the third valve, the fourth valve, includes an unidirectional valve having an input side being leak tight.

11. The arrangement according to claim 10, wherein at least one of the following applies:
    an input side of the first valve faces/is connected to the first chamber;

an input side of the second valve faces/is connected to the second chamber;

an input side of the third valve faces/is connected to the pressure sensor;

an input side of the fourth valve faces/is connected to the pressure sensor;

the input side of the fourth valve is connected to the first chamber, if the third valve is in an open state;

the input side of the third valve is connected to the second chamber, if the fourth valve is in an open state.

12. The arrangement according to claim 1, further comprising:

an eighth valve on one end connected to the first valve, the second valve and the gas entry path and on another end connected to another gas sink.

13. The arrangement according to claim 1, wherein at least one of the following applies:

the gas entry path includes a gas supply valve; and at least one of the first valve, the second valve, the third valve, the fourth valve, includes or is a solenoid valve.

14. The arrangement according to claim 1, further comprising:

an electronic storage containing volume calibration data for the first chamber and the second chamber for calculating the sample volume.

15. The arrangement according to claim 1, further comprising:

a metal assembly in thermal contact with/harboring/including the first chamber, the second chamber and at least one gas path; and a tempering equipment for tempering the metal assembly to a desired temperature, wherein at least a portion of at least one gas path is implemented as a bore in the metal assembly.

16. The arrangement according to claim 15, further comprising:

a third chamber connected to a gas supply source and providing the gas entry path into the first gas path and the second gas path, wherein the third chamber is in thermal contact with/ harbored in the metal assembly.

17. The arrangement according to claim 16, wherein the third chamber encloses a metallic material providing high surface area, wherein the metallic material is in thermal contact with the metal assembly, wherein the metallic material comprises at least one of: a fibrous web, a sintered structure, a loose material, a mesh, a fleece, a fabric, a non-woven fabric, a woven fabric, and a mat.

18. The arrangement according to claim 16, wherein the metal assembly comprises:

a first metal portion harboring the first chamber, a second metal portion harboring the second chamber and a third metal portion harboring the third chamber, wherein the first metal portion is mounted at a side flat surface to a side flat surface of the second metal portion and another side flat surface of the second metal portion is mounted at a side flat surface of the third metal portion.

19. The arrangement according to claim 16, wherein at least one valve is surface mounted on an external surface of the metal assembly.

20. A method of manufacturing an arrangement for measuring a volume of a solid or liquid sample, the method comprising:

providing a first gas path including a first valve, the first gas path being on one end connected, via the first valve, to a first chamber for accommodating the sample and on the other end connected to a gas entry path;

providing a second gas path including a second valve, the second gas path being on one end connected, via the second valve, to at least one second chamber connectable to the sample chamber and on the other end connected to the gas entry path;

providing a third gas path including a third valve, the third gas path being on one end connected to the first chamber and on the other end connected, via the third valve, to a pressure sensor; and providing a fourth gas path including a fourth valve, the fourth path being on one end connected to the second chamber and on the other end connected, via the fourth valve, to the pressure sensor.

* * * * *